UNITED STATES PATENT OFFICE.

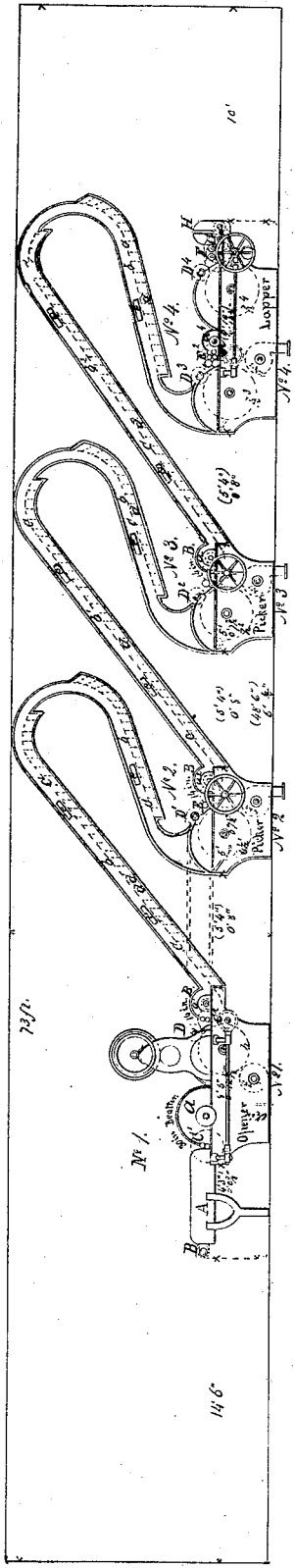

ISAAC HAYDEN, OF LAWRENCE, MASSACHUSETTS.

IMPROVEMENT IN MACHINERY FOR CLEANING COTTON.

Specification forming part of Letters Patent No. 34,363, dated Febuary 11, 1862.

*To all whom it may concern:*

Be it known that I, ISAAC HAYDEN, of Lawrence, in the county of Essex and State of Massachusetts, have invented certain new and useful Improvements in Apparatus or Machinery for Cleaning Cotton and other Fibrous Substances; and I do hereby declare that the same is described and represented in the following specification and drawings.

To enable others skilled in the art to make and use my improvements, I will proceed to describe their construction and operation, referring to the drawings, in which the same letters indicate like parts in each of the figures.

In the accompanying drawings four beating or picking machines are shown and numbered from 1 to 4, and connected by three bent or curved trunks, so that the cotton fed to the first machine passes through each trunk and machine in succession through the whole series.

The nature of my invention and improvements in machinery or apparatus for working and cleaning cotton and other fibrous substances consists in connecting two or more or a series of machines by means of trunks (provided with woven screens and cells) so as to make each machine supply or feed the next machine to it through the trunk that connects the two machines or any two machines in the series; also, in bending or curving the trunk or trunks that connect the machines for cleaning cotton and other fibrous substances so as to carry one part of said trunk over or under or by the side of the other part of the trunk, and thereby obtain a greater length of trunk and a greater area of screening-surface than could otherwise be effected in a room of a given size.

In the accompanying drawings, A, Figure 1, is a trough provided with an endless feeding apron or belt B, which passes around two rollers, which are turned by proper gearing to give the required motion to the belt B, onto which the cotton is spread by the attendant and is carried forward and passes between the fluted iron rollers C', which deliver it to the beater $a$, which turns about seven hundred times per minute and has four blades which knock the cotton from the rollers C' in small locks and throw it against the rotating woven-wire screen $h$, through which the air escapes, while the cotton is carried forward under the roller D, which compresses it into a bat or lap, and it passes between the feeding-rollers $C^2$, which deliver it to the beater $a$, which turns about fourteen hundred times per minute and has two blades which knock or beat the cotton from the rollers $C^2$ and blow it through the bent trunk $b$ over the woven-wire screen C around onto the rotating woven-wire screen $h'$, which receives the air and delivers the cotton under the roller D' to the rollers E, which deliver it to the beater $a'$, (which is similar to the beater $a^2$,) the beater $a^2$ blowing the cotton through the trunk $b'$ to the rotating woven-wire screen $h^2$, similar to those heretofore described. The cotton, after being beat as many times as required and blown through as many trunks as are necessary to separate the dirt, dust, and refuse matter from it, may be lapped or batted and wound onto a roller in the machine, (shown at Fig. 4,) in which the woven-wire cylinder $h^3$, which receives the air and delivers the cotton under the roller $D^3$ to the rollers $E^2$, which convey it to the feeding-rollers $C^5$, which deliver the cotton to the beater $a^4$, which knocks it against the rotating woven-wire screen $h^4$, which delivers it under the roller $D^4$ to the rollers F, which compress it into a lap or bat, and it passes onto the rollers G, where it is wound upon a roller placed between two stands like the one shown at H, from whence it is removed upon the roller to the carding-machine.

The trunks which connect the beating or picking machines may be made straight, as shown by dotted lines between the first and second machines, which may be placed such a distance apart as to make the trunk the required length, or the trunks may be bent or curved, as shown in the drawings, so that one part of the trunk will pass over or under the other part to obtain greater length of trunk and more area of screening-surface than could otherwise be effected in a room of a given size. Each of these trunks consists of two perpendicular sides placed about thirty inches apart and connected together by cross-partitions $c$ $c$, placed about five inches apart and made to extend from the lower edges of the sides up to the middle. The bottom of this trunk is closed by small doors fitted to the partitions so as to form a series of cells $d$ in the lower half of the trunk, which cells are covered by a screen of woven wire extending across the trunk from side to side and supported by the tops of the partitions. The woven screen should be made of smooth wire, about No. 20, woven so as to make about twenty-five or thirty openings to the inch and varnished to prevent the fibers of cotton from catching and hanging in the scores at the junction of the warp and weft. The top of this trunk may be formed of a series of doors that may be removed when required. These trunks are found to work well when there is a space of six inches between the top and screen and the cells are six inches deep under the screen. It is a great advantage to curve these trunks so that the locks of cotton blown through them may be turned over in their passage, so as to let the sand, dirt, and refuse matter fall from both sides of the locks of cotton. Besides, by curving the trunk so as to carry one part over or under or by the side of the other part more length of trunk may be obtained in a room of a given size.

If the blast created by the beater is not sufficient to blow the cotton through the trunk, a fan $f$ may be arranged to draw or suck the air from the rotating screen in a manner well known to engineers, and thereby aid materially in increasing the blast and bringing the cotton from the beater to the rotating screen.

I contemplate that spiked cylinders may be used instead of beaters or scutchers, and that the speed at which either of them are turned may be varied from that heretofore stated; also, that perforated sheet metal may be used to form the rotating screens instead of the wove wire.

The width of these machines may be varied to suit the width of the cords which are to card the cotton.

I claim—

1. Connecting two or more or a series of machines for working cotton and other fibrous substances by means of trunks provided with woven screens and cells, substantially as described, so as to make each machine supply or feed the next machine to it through said trunk, substantially in the manner set forth.

2. In machinery or apparatus for cleaning cotton and other fibrous substances, a trough or trunk which is so bent or curved as to carry one part of said trunk over or under or by the side of the other part of the trunk, so as to obtain a greater length of trunk and a greater area of screening-surface than could otherwise be effected in a room of a given size.

ISAAC HAYDEN.

Witnesses:
O. B. MORSE,
W. B. HAYDEN.